United States Patent [19]

Brown et al.

[11] Patent Number: 5,494,459
[45] Date of Patent: Feb. 27, 1996

[54] CONNECTOR BOX ASSEMBLY FOR TRACTION BATTERY

[75] Inventors: Robert K. Brown, Plymouth; Craig B. Toepfer, Dearborn, both of Mich.

[73] Assignee: Ford Motor Company, Dearborn, Mich.

[21] Appl. No.: 986,181

[22] Filed: Dec. 7, 1992

[51] Int. Cl.⁶ ................................................. H01R 3/00
[52] U.S. Cl. ............................................. 439/500; 439/487
[58] Field of Search ............................... 439/500, 736, 439/271–283, 487; 429/1, 9, 178, 179

[56] References Cited

U.S. PATENT DOCUMENTS

| | | |
|---|---|---|
| 2,444,046 | 6/1948 | Jacobs . |
| 4,335,928 | 6/1982 | Barrett et al. ........................ 439/271 |
| 4,354,726 | 10/1982 | Kato et al. . |
| 4,409,641 | 10/1983 | Jakob et al. ......................... 439/487 |
| 4,545,632 | 10/1985 | Maier et al. ........................ 439/271 |
| 4,555,451 | 11/1985 | Harrod et al. . |
| 4,586,777 | 5/1986 | Wied . |
| 4,637,965 | 1/1987 | Davis . |
| 4,673,240 | 6/1987 | Byfield, Jr. . |
| 4,684,580 | 8/1987 | Cramer . |
| 4,885,524 | 12/1989 | Wilburn . |
| 4,904,198 | 2/1990 | Begitschke et al. ................. 439/278 |
| 4,946,402 | 8/1990 | Fink et al. .......................... 439/281 |
| 5,186,644 | 2/1993 | Pawlicki et al. .................... 439/736 |

*Primary Examiner*—David L. Pirlot
*Attorney, Agent, or Firm*—Damian Porcari; Roger L. May

[57] ABSTRACT

The improved connector box assembly of the present invention includes mating male and female connectors, each of which is insulated in a novel manner to prevent manual touching, especially of the male probe during electrical connection, and also to prevent manual touching of the electrically live female conductor when not engaged with the male connector element. The female electrical receptacle is recessed within elongated neck-like electrical insulation means for disposition over one end of the female electrical receptacle and to permit relatively snug entry thereinto of the male electrical probe. The female electrical receptacle is a substantial distance front the orifice of the elongated neck means of such insulation. The female electrical receptacle electrical insulating structure is contained within an insulative housing which mates with an insulative structure at the base of the male electrical probes and which serves as an insulative collar extending a substantial distance along the shaft of the male electrical probes to mate with the female electrical receptacle electrical insulation means.

20 Claims, 3 Drawing Sheets

CONNECTOR BOX ASSEMBLY FOR TRACTION BATTERY

FIELD OF THE INVENTION

The present invention is directed to an improved connector box assembly. In particular, the present invention is directed to an improved connector box assembly for preventing electrical leakage during coupling and uncoupling of a high voltage battery with various high voltage DC power lines, as may be useful for powering an electrical vehicle, and yet further particularly in some embodiments to means for preventing manual touching of male and female couplers carrying substantial electrical charges.

BACKGROUND OF THE INVENTION

Certain improvements in automobile power trains have been suggested, and in particular the replacement of internal combustion engine power with electric power apparatus, for example, including an electric battery and electric motor. Such electric batteries, known as "traction batteries" include sodium sulfur batteries of sufficient capacity to drive a 75 horse power traction motor, which in turn in certain suggested embodiments drives the front wheels of the electric vehicle via a single speed transaxle assembly.

Various types of electric connector devices have been utilized in the prior art to provide electrical connection between batteries and power lines of different types. The teaching of U.S. Pat. No. 2,444,046 to Jacobs is exemplary. The Jacobs patent teaches a battery coupling device which includes electrodes embedded in insulation. Such electrodes form a pair of recesses into which the prongs of a male electrode are inserted. The insulation material surrounds the electrodes. The coupler of the Jacobs device is used for purposes of charging a battery and is not intended to be removed. There are several deficiencies and needs for improvement over the teaching of the Jacobs '046 patent. Specifically, the battery cells thereof are not permanently connected to the female connectors. No heat sink capability is provided in regard to the female connectors. Also, there is no provision for auxiliary connections, such as for example, voltage sensing or heating cable connections. Additionally, there is no interlock mechanism to prevent disconnection under load. Yet further, manual touching of the charge connector when disconnecting is possible. Furthermore, no structure is taught for hermetically sealing the connecting mechanism.

Another prior art device is set forth in U.S. Pat. No. 4,555,451 to Harrod et al. showing a fuse which slides into a case. The battery thereof may be utilized for a child's riding toy. However, this particular apparatus is not sealed from ambient conditions and the leads thereof are manually accessible.

Also illustrative of the prior art is the structure shown in U.S. Pat. No. 4,637,965 to Davis et al. which shows a connector structure for a battery. The connector includes a terminal which forms stems and prongs. Leads are connected to the terminals of the battery, and the stems and prongs are used to draw energy from the battery. However, the structure of the Davis patent has exposed ends which are electrically charged, and which would be inappropriate for the large charge of a 330 volt traction battery.

SUMMARY OF THE INVENTION

According to a first aspect of the present invention, an improved connector box assembly is provided for preventing electrical leakage during coupling and uncoupling of a high voltage battery, such as a traction battery, with various high voltage power lines. The improved connector box assembly of the present invention also facilitates the fused distribution of signal and heater line connections. Such line connections may preferably constitute, for example, battery heater lines and voltage/temperature sensor lines. In accordance with certain preferred embodiments, a connector box assembly hereof provides hermetic sealing and sinks for battery pass through bus bars. In addition, the improved connector box assembly of the present invention may include heat sinks for battery bus bar transmission of substantial heat contained within the battery, as well as a hermetic seal to the battery interior.

The above beneficial functioning of the connector box assembly of the present invention is facilitated by means of novel structure including mating male and female connectors, each of which is insulated in a manner to prevent manual touching, especially of the male probe during electrical connection, and also to prevent manual touching of the electrically live female conductor when not engaged with the male connector element.

In particular, the female electrical receptacle is recessed within elongated neck-like electrically insulated means for disposition over one end of the female electrical receptacle and to permit relatively snug entry thereinto of the male electrical probe. Thus, the female electrical receptacle is disposed a substantial distance from the orifice of the elongated neck means of the insulation. In accordance with one feature of the functioning of this structure, the male electrical probe may be inserted into the female receptacle for electrical contact therebetween, but manual touching of the male electrical probe during coupling and uncoupling is inhibited.

In preferred embodiments, the female electrical receptacle electrical insulating structure is contained within an insulative housing, which mates with an insulative structure at the base of the male electrical probes and which serves as an insulative collar and extends a substantial distance along the shaft of such male electrical probes to mate with the female electrical receptacle electrical insulating means. In this way, the insulating components cooperate insulatively to prevent manual touching.

Additional features, advantages and objects of the connector box assembly of the present invention will be apparent to those of ordinary skill in the art in the following detailed description of certain preferred embodiments and accompanying drawings.

BRIEF DESCRIPTION OF THE DRAWINGS

The detailed description of certain preferred embodiments of the improved connector box assembly of the present invention is provided hereinbelow with reference to the accompanying drawings, wherein the same reference numeral is used for a given feature in all figures, and in which.

Figure 1:
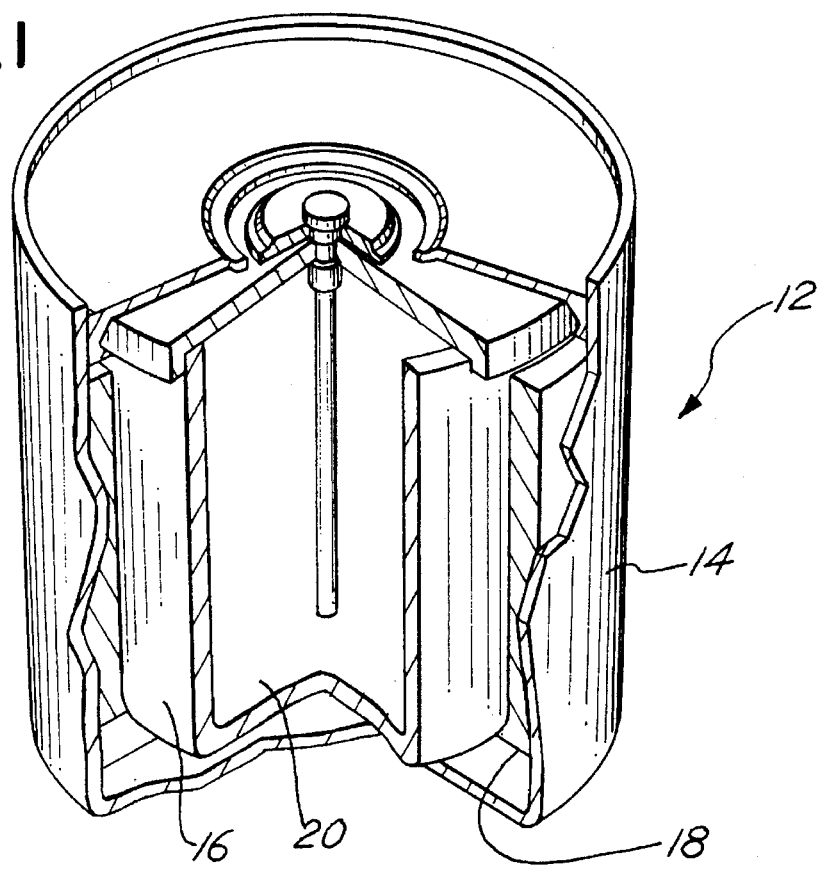
FIG. 1 is a sectional perspective view of a sodium sulfur battery which is one form of traction battery usable in connection with the connector box assembly of the present invention.

In the discussion below and in the claims which follow, it should be understood that all directional terms including, for example, reference to an upper or lower surface of the component, are used for convenience and correspond generally to the orientation illustrated in the drawings. Such terms are not meant to limit the invention to use in any particular orientation.

DETAILED DESCRIPTION OF CERTAIN PREFERRED EMBODIMENTS

In accordance with certain highly preferred embodiments of the invention, automotive traction battery connector box assemblies are provided which:

1. are able to carry 75 horse power loads in terms of electrical current and heat, and to do so at 330 volts;
2. meet European "finger poking" requirements in having reduced access to live pins when the battery is being connected or disconnected;
3. provide relatively safe outlet and connection points for battery voltage signal lines and heater connections;
4. provide hermetic sealing of battery pass throughs;
5. provide encasement of heat sinks to distribute heat from battery pass throughs;
6. provide encasement of traction fuses;
7. provide and interlock facility to prevent disconnection under load; and
8. provide "0" ring seals for immersion (fording).

Figure 2:
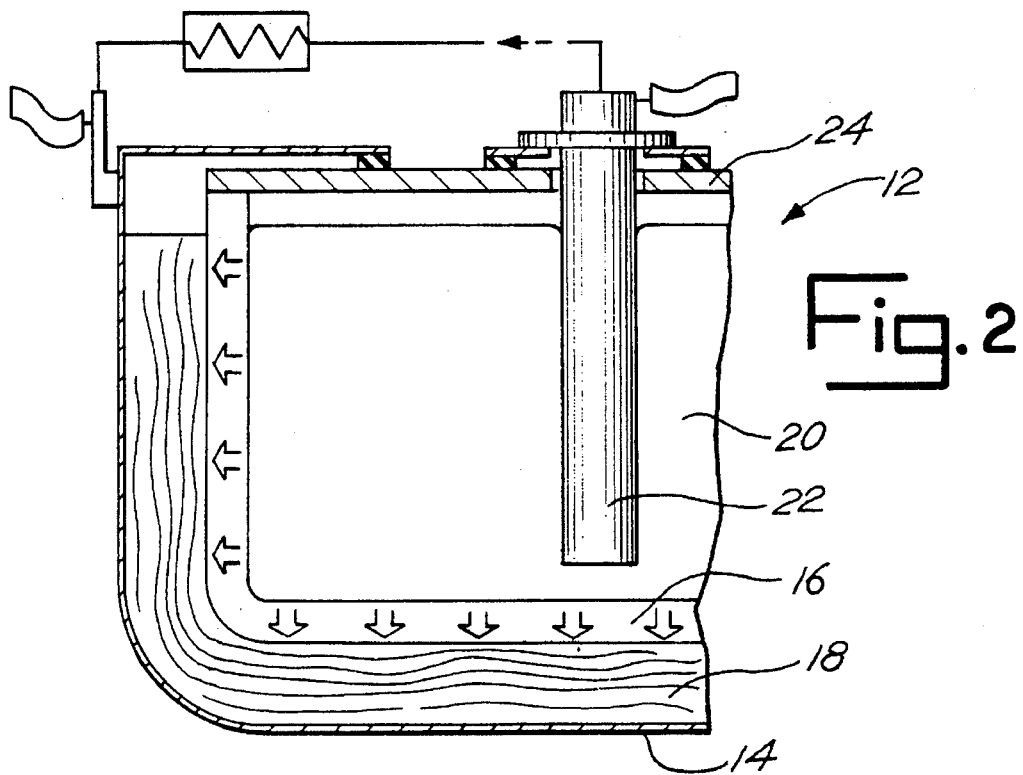
FIG. 2 is an enlarged transverse cross-sectional view of the sodium sulfur battery of FIG. 1 showing schematic operation thereof.
Figure 3:
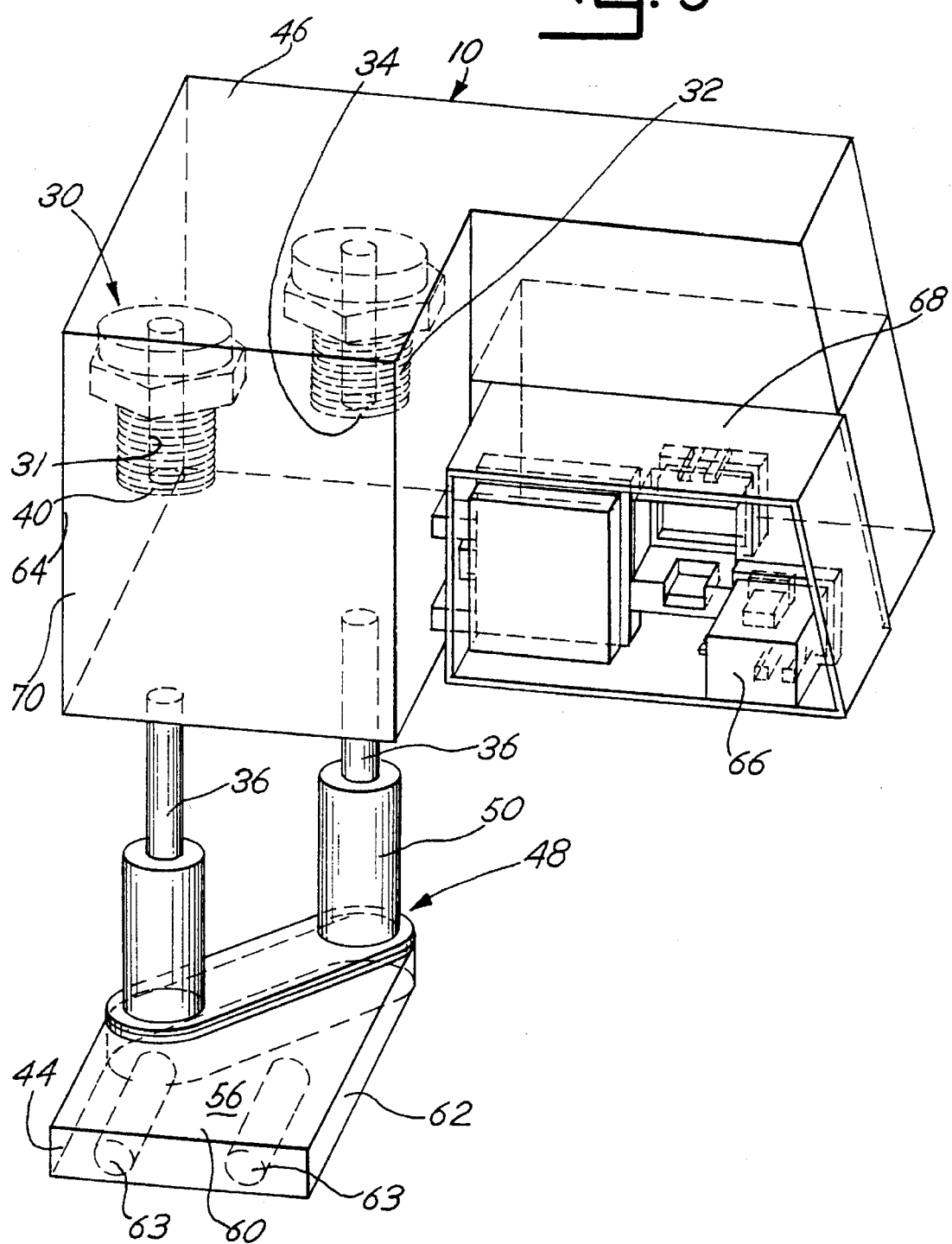
FIG. 3 is a perspective view of a connector box assembly of the present invention showing the engagement of male and female electrical connections and the respective insulative structures therefor.
Figure 4:
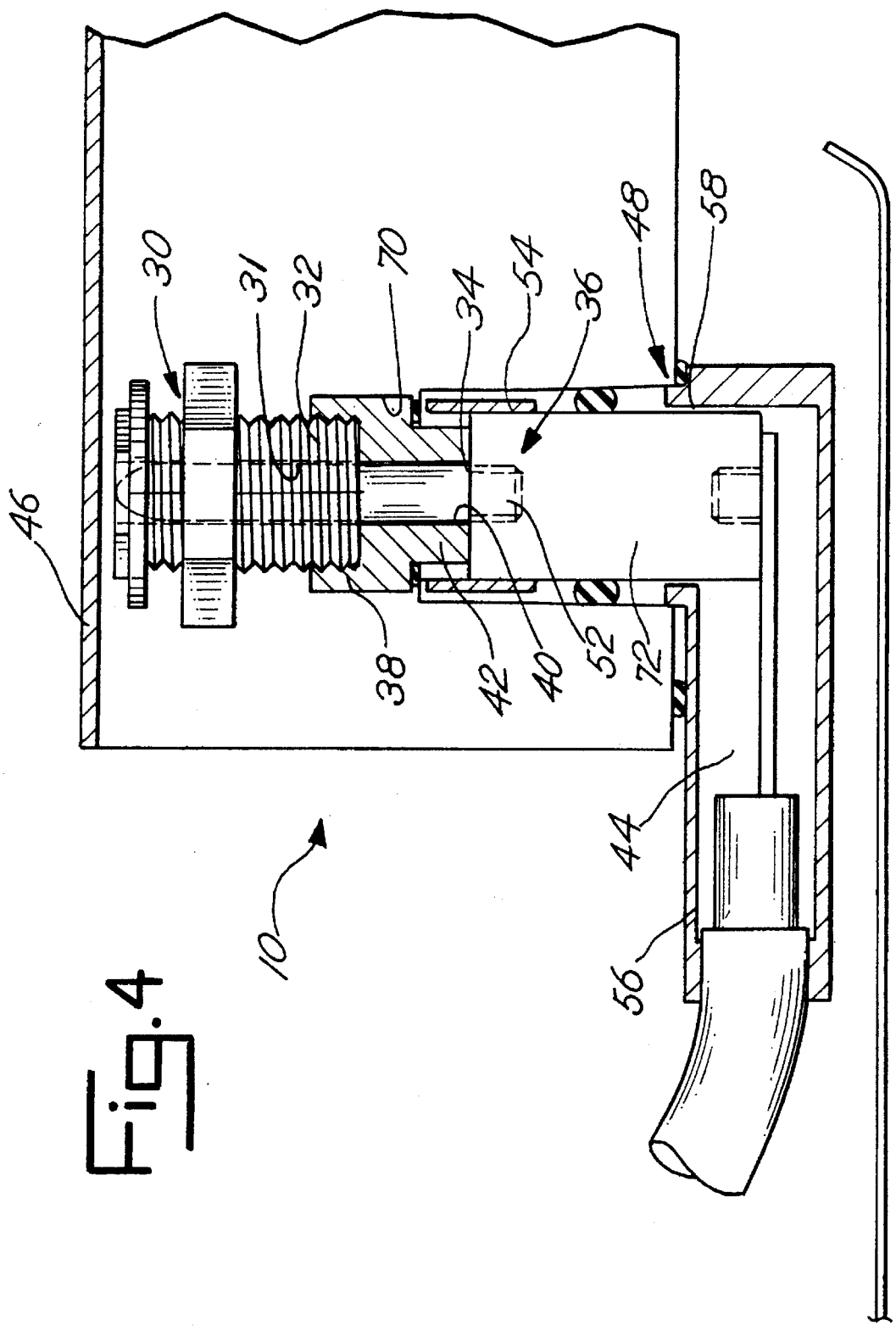
FIG. 4 is a transverse cross-sectional view of the improved connector box assembly of the present invention particularly showing the sealing means for the male and female electrical connectors and certain safety structures of the apparatus for preventing accidental manual touching of the electrically charged male and female electrical connectors.

Referring now to the drawing, the improved connector box assembly generally 10, as shown in FIGS. 3 and 4 may be utilized in connection with high voltage batteries, and in particular preferred embodiments, traction batteries, such as sodium sulphur traction batteries, as shown generally in FIGS. 1 and 2. Traction battery 12 has in general been disposed in front of the rear axle of an electric vehicle (not shown). Sodium sulfur battery 12 includes an outer casing 14 and uses a solid electrolyte, such as beta-alumina electrolyte 16, which separates a liquid sodium electrode 18 from a liquid sulfur electrode 20, unlike the more usual lead acid battery, which has, for example, a liquid electrolyte (dilute sulfuric acid) separating two solid electrodes.

The chemical energy of the reaction is converted into electric energy, as shown schematically in FIG. 2, and is transmitted by means of a current collector 22 which is insulated by insulator 24. When the cell is charged, sodium and sulphur are regenerated from the sodium sulphide, and electrical energy is converted into chemical energy. These mechanisms are understood by those of ordinary skill in the art and need not be set forth in detail herein.

The sodium, sulphur and the beta-alumina ceramic electrolyte are sealed within deep drawn stainless steel containers to form the individual battery cells. The cells are intended to be maintenance free. Because the battery cells operate at 350 degrees Celsius, the battery is contained in a vacuum insulated stainless box (i.e., two skins), which is not separately shown herein. Heat is generated within the cells during charge and discharge, with maximum heat generation typically occurring during acceleration from a standing start.

This internal heat energy offsets the slow natural cooling rate of the battery, so it will remain at the required operating temperature for an extended period of time when not in use. Electric heaters within the battery are used for bringing the battery up to operating temperature during commissioning or during charging/recharging.

As indicated above, the electrolyte of the sodium sulfur battery 12 is made from beta-alumina ceramic. The atomic structure of beta-alumina ceramic is such that it acts as a selective ion filter. Sodium ions pass through it to react with sulphur to form sodium sulphide when the cell discharges into an electrical load.

An electric vehicle is contemplated to use a sodium sulphur traction battery 12 with sufficient energy to achieve over 100 miles range for the U.S. Federal Urban Driving Schedule (FUDS). The nominal battery voltage is 320 volts D.C., with a nominal capacity of 120AH.

Referring now to FIGS. 3 and 4 of the drawing, the improved connector box assembly 10 is depicted in one preferred embodiment. Such improved connector box assembly 10 functions for preventing electrical leakage during coupling and uncoupling of leads from, for example, high voltage battery 12 with various high voltage direct current lines, as set forth in greater detail hereinbelow. The connector box assembly 10 includes at least one, and in preferred embodiments two female electrical receptacles 30 each having a penetrable sleeve 31 therein formed from a conductive material. The female electrical receptacle 30 is insulated by electrical insulation 32, which surrounds the penetrable sleeve 31 to provide electrical insulation to the exterior of the conductive sleeve 31 and which is disposed within the female electrical receptacle 30. Such electrical insulation 32 provides electrically conductive access to the inner surface of penetrable sleeve 31 through one end 34 thereof.

At least one, and in preferred embodiments two male electrical probes 36 are disposed during electrical connection within penetrable sleeves 31. Each male electrical probe 36 is formed of a conductive material to provide electrical contact between the interior of female sleeve 31 and the exterior of male probe 36.

The female electrical receptacle electrical insulator includes an orifice 40 opening into elongated neck 42 for disposition over one end of female electrical receptacle 30 and which projects outwardly therefrom. Such orifice 40 functions to permit relatively snug entry into sleeve 31 by male electrical probe 36. Such orifice 40 also functions to recess the conductive penetrable sleeve 31 of female electrical receptacle 30 a substantial distance from orifice 40 of electrical insulator 38. The result is that male electrical probe 36 may be inserted into and within female receptacle 30 for electrical contact therebetween.

In another aspect of the connector box assembly 10 of the present invention, the paired male electrical probes 36 are preferably carried by an insulative disconnect handle 44. Female electrical receptacles 30 are disposed within insulative housing 46, as shown in FIGS. 3 and 4.

A manual isolator 48 for male electrical probe 36 is provided in order to prevent manual touching of male electrical probe 36 when engaged with female electrical receptacle 30 and accordingly when conducting electrical current. Manual isolator 48 for male electrical probe 36 includes an insulative base 50 into which male electrical probe 36 is embedded at the proximal end 52 thereof to project from the surface thereof. Side guard shield 54 is disposed laterally of the exterior surface of insulative base 50 to prevent manual touching of male electrical probe 36 during coupling and uncoupling of male electrical probe 36 with female electrical receptacle 30.

Neck 42 of female electrical receptacle electrical insulator 38 is sufficiently small in transverse cross-sectional shape, in preferred embodiments, to prevent the poking of a finger thereinto and to prevent manual touching of the conductive sleeve 31 of female electrical receptacle 30.

The side guard shield 54, which is functional during engagement of male electrical probe 36 with female electrical probe 30, is disposed substantially circumferentially about the elongated neck 42 of female electrical receptacle electrical insulator 38 during full engagement. In this disposition of full engagement, the insulated base of manual isolator 48 is disposed adjacent to elongated neck 42 of female electrical receptacle insulator 38.

Disconnect handle 44 connected to male electrical probe 36 includes an upper surface 56 for disposition of paired male electrical probes 36,36 thereon. Paired male electrical probes 36,36 are disposed, in preferred embodiments, in staggered array as shown in FIG. 3. A projection surface 58 for disposition of the paired male electrical probes 36,36 thereon is provided, and with disconnect handle 44 having a front portion 60. In further particulars, paired male electrical probes 36,36 may be disposed in staggered array on disconnect handle 44 with respect to front portion 60 thereof to define a manually grippable portion 62 of front portion 60 of disconnect handle 44. Fuses 63,63 are preferably embedded in disconnect handle 44.

Female electrical receptacles 30,30 are disposed within housing 46. As shown in FIG. 3, housing 46 has wall 64 thereof which is disposed adjacent staggered male electrical probes 36,36 to expose for manual gripping the manual grippable portion 62 of front portion 40 of disconnect handle 44.

Electrical outputs 66 are incorporated within the improved connector box assembly generally 10 of the present invention for various auxiliary functions, including, for example, a thermocouple temperature measurement outlet, a voltage measurement outlet, and/or a heat outlet, as shown schematically in FIG. 3, wherein a secondary box 68 may be disposed adjacent assembly housing 46 for such auxiliary functioning.

Insulative housing 46 for female electrical receptacles 30,30 includes elongated housing openings 70,70. Male electric probes 36,36 have an elongated insulative collar 72 disposed about proximal end 52 thereof and about a substantial portion of the length of male electrical probes 36,36. Elongated insulative collars 72,72 are disposed within the elongated housing openings 70,70 for mating insulative maintaining engagement therewith.

As shown particularly in FIGS. 3 and 4, a heat sink 33 is disposed preferably about female electrical receptacle 30 for conducting heat therefrom, although other heat conducting dispositions are contemplated to be within the scope of the present invention.

Of course, various electrically insulative and electrically conductive materials which may be utilized to form component parts of the structure of the present invention, and variations and equivalencies thereof, are known to those of ordinary skill in the art, and thus need not be described in detail herein.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

We claim:

1. A connector box assembly for coupling and uncoupling a high voltage battery With a high voltage electrical line, the connector box assembly comprising:

at least one female electrical receptacle, each having a penetrable sleeve thereon formed from a conductive material;

female electrical receptacle electrical insulation means for surrounding the penetrable sleeve to provide exterior electrical insulation to the penetrable sleeve and to provide electrically conductive access to the inner surface of the penetrable sleeve through one end thereof;

at least one male electrical probe which is disposable during electrical connection within the penetrable sleeve, said male electrical probe having an exterior surface formed of a conductive material to provide electrical contact with the inner surface of the penetrable sleeve, the female electrical receptacle and projecting outwardly therefrom, to permit relatively snug entry thereunto of the male electrical probe, and to recess the penetrable sleeve of said female electrical receptacle from said orifice; and a heat sink disposed within said connector box assembly to convey heat therefrom.

2. The improved connector box assembly of claim 1 wherein the neck means of the female electrical receptacle electrical insulating means is sufficiently small in transverse cross-sectional shape to prevent finger insertion thereinto to prevent manual touching of the penetrable sleeve of the female electrical receptacle.

3. The improved connector box assembly of claim 1 further comprising electrical outputs for functions selected from the group consisting of thermocouple temperature measurement, voltage measurement and heater operation.

4. The improved connector box assembly of claim 1 wherein said high voltage battery comprises a motor vehicle traction battery.

5. The improved connector box assembly of claim 1 further comprising male fuse means disposed in electrical contact with the male electrical probe.

6. The improved connector box assembly of claim 1 having corresponding pairs of the male electrical probes and female electrical receptacles, the paired male electrical probes being carried by an insulative disconnect handle.

7. The improved connector box assembly of claim 2 wherein the insulative disconnect handle includes manual grasping means for imparting a generally downward disengaging motion thereto.

8. The improved connector box assembly of claim 6 wherein the pair of male electrical probes on a surface of the insulative disconnect handle is disposed in staggered array.

9. The improved connector box assembly of claim 2 wherein the female electrical receptacles are disposed within an insulative housing.

10. The improved connector box assembly of claim 4 wherein the male electrical probes have a base thereof, and the insulative housing for the female electrical receptacle includes an elongated housing opening, an elongated insulative collar is disposed about the base and a substantial portion of the length of the male electrical probes, and the elongated insulative collar is disposable within the elongated housing opening for mating engagement therewith.

11. The improved connector box assembly of claim 10 wherein said battery comprises a sodium sulfur traction battery.

12. The improved connector box assembly of claim 10 further comprising sealing means for sealing between the elongated insulative collar and the insulative housing.

13. The improved connector box assembly of claim 10 further comprising male fuse means disposed in electrical contact with the male electrical probe, internally of the elongated insulative collar.

14. The improved connector box assembly of claim 6 wherein the insulative disconnect handle includes a front portion and a projection surface, the pair of male electrical probes thereon, said disconnect handle having a front portion thereof, and said pair of male electric probes being disposed on the projection surface staggered array with respect to the front portion to define a manually grippable portion of the front portion.

15. The improved connector box assembly of claim 14 wherein the female electrical receptacles are disposed within a housing and the housing has a wall disposed adjacent the staggered male electrical probes to expose for manually gripping said manual grippable portion of said front portion of said disconnect handle.

16. The improved connector box assembly of claim 1 further comprising manual isolation means for the male electrical probe for preventing manual touching of the male electrical probe when engaged with the female electrical receptacle.

17. The improved connector box assembly of claim 16 wherein the manual isolation means for the male electrical probe comprises an insulative base in a surface of which a proximal end of the male electric probe is embedded, and side-guard shield means disposed laterally of the surface of the insulative base for preventing manual touching of the male electrical probe during coupling and uncoupling of the male electrical probe with the female electrical receptacle.

18. The improved connector box assembly of claim 17 wherein the side-guard shield means during full engagement of the male electrical probe with the female electrical receptacle is disposed substantially circumferentially about the elongated neck means of the female electrical receptacle electrical insulating means.

19. The improved connector box assembly of claim 17 wherein, during full engagement of the male electrical probe and the female electrical receptacle, the insulative base of the manual isolation means is disposed adjacent to the elongated neck means of the female electrical receptacle insulating means.

20. In combination, an improved connector box assembly, coupled to a high voltage battery, said connector box assembly comprising:

at least one female electrical receptacle, each having a penetrable sleeve thereon formed from a conductive material;

female electrical receptacle electrical insulation means for surrounding the penetrable sleeve to provide exterior electrical insulation to the penetrable sleeve and to provide electrically conductive access to the inner surface of the penetrable sleeve through one end thereof; and at least one male electrical probe which is disposable during electrical connection within the penetrable sleeve, said male electrical probe having an exterior surface formed of a conductive material to provide electrical contact with the inner surface of the penetrable sleeve, the female electrical receptacle and projecting outwardly therefrom, to permit relatively snug entry thereunto of the male electrical probe, and to recess the penetrable sleeve of said female electrical receptacle from said orifice.

\* \* \* \* \*